Feb. 26, 1952     A. FRUM     2,586,810

LOCALIZER AND GLIDE PATH SYSTEM

Filed Oct. 21, 1947     2 SHEETS—SHEET 1

INVENTOR.
ALEXANDER FRUM
BY
R. P. Morris
ATTORNEY

INVENTOR.
ALEXANDER FRUM
BY
RP Morris
ATTORNEY

Patented Feb. 26, 1952

2,586,810

UNITED STATES PATENT OFFICE 2,586,810

LOCALIZER AND GLIDE PATH SYSTEM

Alexander Frum, Far Rockaway, N. Y., assignor to International Standard Electric Corporation, New York, N. Y., a corporation of Delaware Application October 21, 1947, Serial No. 781,165

26 Claims. (Cl. 343—106)

1

The present invention relates to radio beacons and, more particularly, to a localizer and/or glide path system for the instrument landing of aircraft.

In instrument landing systems it has heretofore been proposed to provide patterns which overlap in space, the line or zone of overlap constituting a localizer or glide path course. Such systems generally provide a switching on or off in alternate fashion of the overlapping patterns or a modulation at different audio frequencies of these patterns. The location of the course is defined by comparison of the signal amplitude, and the sharpness of definition of the course thus depends upon the amplitude difference.

It is an object of this invention to provide a localizer and/or glide path beacon, wherein the course line is defined by the timing of received signals, instead of by amplitude comparison.

According to my invention I provide a radio beacon or beacons wherein a first radio beam is caused to oscillate within given limits over a zone including the beacon course or glide path line. A second radiation is transmited covering the entire zone or region of the beam oscillation. Signals are transmitted on this second radiation which are timed with respect to the beam oscillation. By comparison of the timing of these signals and the energy received from the beam a craft may determine its location with respect to the beacon line.

The invention further contemplates providing of means for shaping the received energy beam to sharpen the indication so that a more precise indication of the course line will be obtained.

According to one feature of the invention, there may be provided a sharply directive beam which oscillates between two predetermined limits, and a stationary beam which covers the area between said limits but which is triggered on only when the first beam passes through a predetermined reference position.

According to another feature of the invention, there may be provided two sharply directive beams originating at two points positioned symmetrically with respect to a reference line, the two beams oscillating symmetrically toward and away from said refernce line whereby they will intersect on a craft only when the position thereof coincides with this line.

According to a further feature of the invention, the oscillating beam or beams of a localizer for aircraft landing systems may be periodically suppressed, preferably for alternate half-periods of their oscillations, so as to avoid false indica-

2 tions and to provide an interval for the emission of glide path signals.

The above and further objects and features will become apparent from the following description, taken in conjunction with the acompanying drawing in which.

Figure 1:
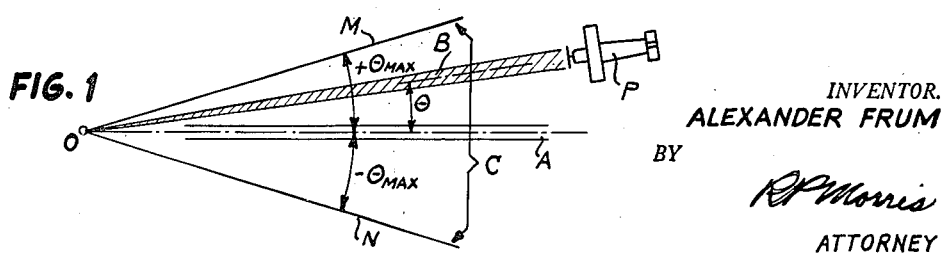
Fig. 1 is a diagrammatic plan view of a radio beacon used for azimuth indications in an aircraft homing system.

In Fig. 1 there is shown an air strip or runway A and an airplane P which approaches the runway at an azimuth angle $\theta$. At a point O, located on a line forming a rearward extension of the runway, there is provided an antenna array adapted to produce a sharply directive beam B, oscillating between the limits M and N, and a stationary beam C covering the angle of $2\theta_{max}$ which corresponds to the area between the limits M and N. The beam C, however, is triggered on only during the instant the beam B passes through zero, i. e. coincides with the runway A, thereby providing a reference or marker pulse on the craft from which its horizontal angular deviation from the runway may be determined. Thus, if the airplane P should be dead above the runway A, the beams B and C would be received simultaneously on the craft; if, as shown in the figure, the angle $\theta$ is greater than zero but less than $\theta_{max}$ (which may be of the order of $\pm 10°$), the beam B will not reach the craft until after it has traveled in a counter-clockwise direction for a period of time which is proportional to $\theta$. Aboard the aircraft there will be received, accordingly, a first or marker pulse and a second or scanner pulse variably spaced from each other which may be utilized, in any known manner, to give the desired indication.

After the beam B has reached the limit of its travel at M, it should be extinguished to avoid the delivery of a second scanner pulse to the aircraft which would produce confusing indications; the beam is keyed on again when it passes the reference line A, to be suppressed once more on its return swing from limit N to zero position.

Figure 2:
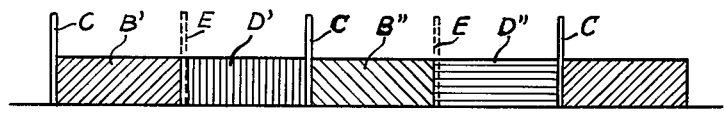
Fig. 2 is a diagram illustrating the emission characteristics of a radio beacon according to the invention.

The intervals in which both beams B and C are suppressed may be used for the emission of glide path signals as schematically indicated in Fig. 2 B', B'' indicate the intervals in which the beam B is keyed on and travels, respectively, in the positive and the negative sector of θ; at the beginning of each of these intervals there occurs the brief marker pulse C. The remaining intervals are filled with glide path signals D', D'' which may be of any character whatsoever but, more particularly, may be produced in analogous manner as the localizer signals; in this event there will be a special glide path marker pulse E at the beginning of each interval D' D''.

Figure 3:
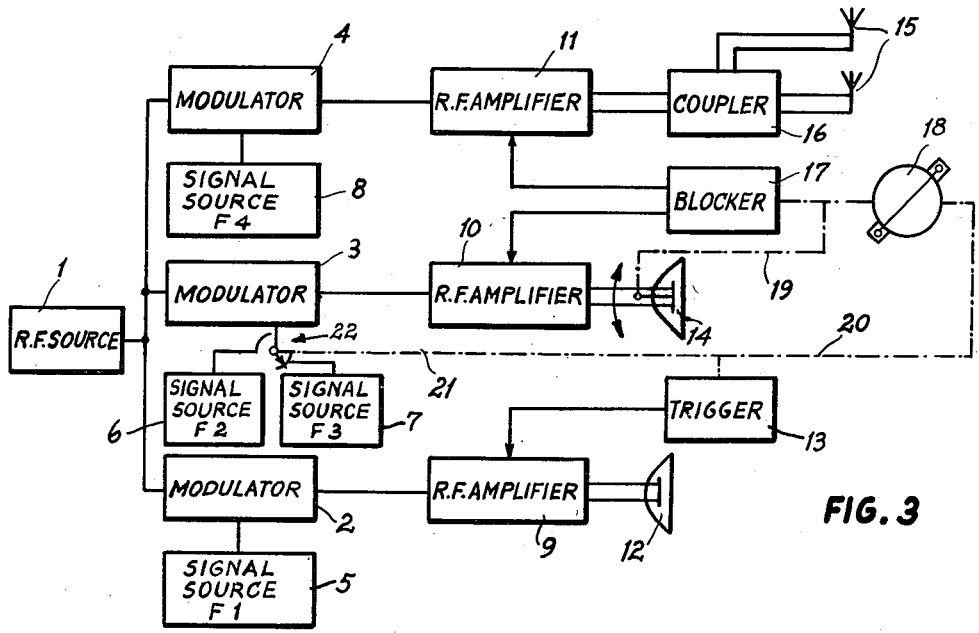
Figs. 3 and 4 are respective circuit diagrams of a transmitter and a receiver used for simultaneous localizer and glide path indications.

A transmitter suitable for emitting interleaved localizer and glide path signals is shown in Fig. 3. The transmitter comprises a source of radio frequency 1, connected in parallel to three modulators 2, 3 and 4. Modulator 2 receives signals of a frequency F1 from a source 5; modulator 3 receives signals of alternate frequencies F2 and F3 from two sources 6 and 7, respectively; modulator 4 receives signals of a frequency F4 from a source 8. The output of modulators 2, 3 and 4 is applied, respectively, to three radio frequency amplifiers 9, 10 and 11. Amplifier 9 feeds a stationary directional antenna 12 at intervals controlled by a trigger circuit 13. Amplifier 10 feeds a swingable directional antenna 14. Amplifier 11 feeds an array of glide path antennae 15 by way of a coupler 16. There is further provided a blocking circuit 17 for alternately energizing the localizer antenna 14 and the glide path array 15 under the control of a motor 18.

The control for oscillating the directional antenna 14 is indicated strictly schematically as a linkage 19 between the motor 18 and the antenna. It should be noted, however, that it will not be necessary to displace the antenna as a whole, the displacement of the beam being obtainable by oscillating the antenna dipole within its reflector or controlling the phase of energy supplied to a directive array. Any other means for displacing the beam may of course be used.

While mechanical control has been illustrated for the sake of simplicity, electronic scanning is often preferable as it permits high speed scanning which may be desirable for supplying indication as sufficient frequency to control an automatic pilot gear or other similar apparatus.

The trigger 13 is actuated by the motor 18 by means of a mechanical linkage 20; a linkage 21 connects the motor with a switch 2, serving to connect the modulator 3 alternately to the sources 6 and 7. The synchronization of the various devices controlled by the motor 18 will be clear from a consideration of Fig. 2, previously discussed.

While it is possible to use for the glide path array a circuit arrangement analogous to that used for the localizer signals, it should be noted that the localizer according to the invention is compatible with a great variety of known glide path systems and no particular one of such systems has therefore been specifically illustrated in Fig. 3.

Figure 4:
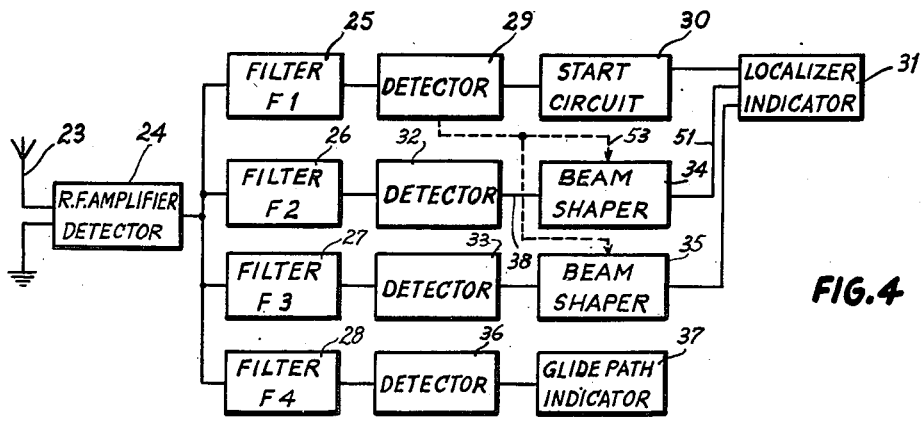

In Fig. 4 there is shown a receiver for receiving and demodulating the bursts of ultra high frequency energy (which may have a frequency of 5,000 megacycles) from the transmitter shown in Fig. 3. Such receivers will normally be provided on the airplane, although it is to be understood that the invention is also applicable to systems wherein a beam striking the craft triggers a transmitter aboard the latter to transmit bursts of U. H. F. energy to a control station on the ground which translates them into the desired information for retransmission to the airplane. The receiver comprises an antenna 23, connected to a radio frequency amplifier and detector circuit 24 which detects the modulating envelope of the carrier wave and feeds it to four filters 25, 26, 27 and 28. Filter 25 selects the signals of frequency F1, which correspond to the modulation of the marker beam C, and feeds them to a detector 29 which applies the detected pulse to a start circuit 30 of the localizer indicator 31. Filters 26 and 27 select, respectively, the scanning frequencies F2 and F3 and apply them over respective detectors 32, 33 and beam shaping circuits 34, 35 to the localizer indicator 31. Filter 28 selects the glide path signals of frequency F4 and applies them by way of a detector 36 to a glide path indicator 37.

Figure 5:
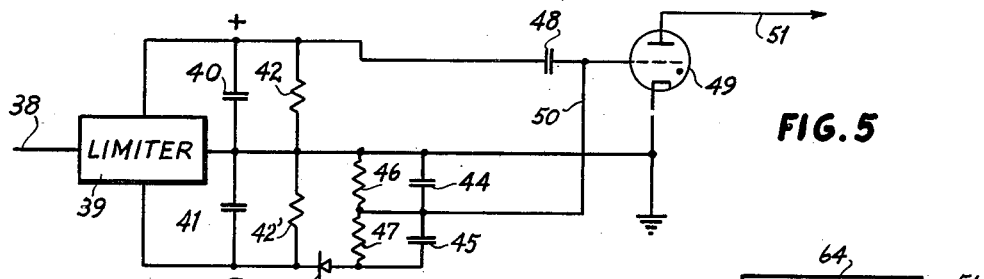
Figs. 5 and 6 are circuit diagrams illustrating alternative methods of beam sharpening in accordance with the invention.
Figure 6:
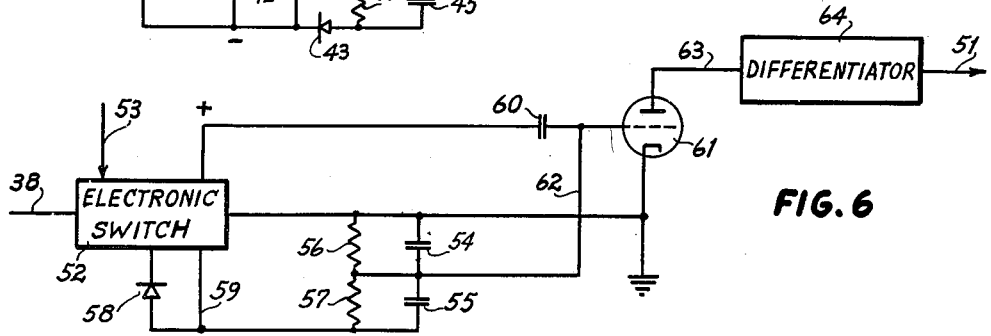

The operation of the receiver shown in Fig. 4 will be clear from the foregoing, except for the beam shapers 34 and 35 which serve to sharpen the beam B with respect to its effect upon the indicator. Two possible forms of realization of these beam sharpening circuits are shown in Figs. 5 and 6 and will be subsequently described. It will be understood by those skilled in the art that the indicator 31 may comprise a pulse generator such as a multivibrator which will be triggered on by the marker pulse and triggered off by the scanner pulse, the generated pulses (which may have been stored on a condenser) being subsequently integrated and applied to one or the other winding of a meter of the center zero type depending on whether a scanner pulse modulated with frequency F2 or F3 is received. For an angle θ=0 the width of the pulses will be zero.

The beam shapers 34 and 35 being identical, only one of them need be described in detail. In Fig. 5 there is shown a circuit arrangement by which the localizer indicator 31 may be triggered at the instant when the center of the beam B is received by the antenna 23. The detector 32 feeds, over a connection 38, a limiter 39 having a balanced output as shown. The limiter applies positive pulses to a condenser 40 and negative pulses to a condenser 41, the two condensers being shunted by resistors 42, 42', respectively. Connected to the condenser 41 over a rectifier 43 are a pair of series condensers 44, 45 shunted, respectively, by resistors 46, 47. The ungrounded terminal of condenser 40 is connected through a coupling condenser 48 to the grid of a thyratron tube 49 and the ungrounded terminal of condenser 44 is directly connected to the same grid as indicated at 50. An output connection 51 leads to the indicator 31 of Fig. 4.

The output of the limiter 39 consists of pulses the width of which is defined by the spacing between two equisignal points on the beam B. The circuits 40, 42 and 41, 42' have similar time constants which result in the acquisition of a similar charge by the two condensers, albeit of opposite polarity, these time constants having been selected sufficiently small to permit the substantially complete discharge of the condensers between cycles. The time constant of the network 44, 45, 46, 47, however, is of the order of several cycles which causes the series combination of condensers 44, 45 to acquire a steady charge substantially equal to the peak charge of condenser 41, rectifier 43 preventing a discharge of condensers 44, 45 by way of resistor 42'. If condensers 44 and 45 as well as resistors 46 and 47 are of equal magnitude, the potential on the negative terminal of condenser 44 will be half that of condenser 45; by virtue of the connection 50 the potential of condenser 44 is applied as a negative bias to the grid of thyratron 49. The thryratron is arranged so that it will be rendered conductive when the potential on condenser 40, applied through condenser 48, cancels the negative bias from condenser 44 whereby a trigger pulse is applied to the indicator 31 over connection 51. Suitable means (not shown) are of course provided to restore the tube 49 to non-conductive condition after the trigger action has been completed.

Thus it will be seen that the indicator 31 is triggered when the condenser 40 has charged to a voltage which is substantially one-half the average peak voltage applied thereto over a number of cycles, thereby defining the instant when the center of the beam strikes the craft. With proper design of the circuits this arrangement can be made independent, within wide limits, from the absolute amplitude of the beam as received and from the duration of its impingement upon the antenna of the receiver.

The alternative circuit arrangement of Fig. 6 operates in somewhat different manner. With this arrangement the indicator will be triggered by the trailing edge of the beam, at the instant when the intensity of the scanner pulse has dropped to a predetermined fraction of its peak. Here the detector 32 is connected to an electronic switch 52 which is also connected to the detector 29 as indicated at 53, Figs. 4 and 6. The switch 52 has a balanced output, negative potential being applied across the series combination of condensers 54 and 55 shunted, respectively, by resistors 56 and 57. The value of these resistors may be very high since their prime function is to prevent the accumulation of spurious charges at the junction of the two condensers. The charging circuit for condensers 54, 55 leads over a rectifier 58 which prevents a discharge through the switch other than by way of a connection 59. The positive output terminal of switch 52 is connected, over a condenser 60, to the grid of a three-element vacuum tube 61 which over a path 62 is also directly connected to the negative terminal of condenser 54.

The marker pulse from detector 29 acts upon the electronic switch 52, by way of connection 53, in such a manner that the discharge path 59 will be blocked whereupon the condensers 54, 55 are charged during the subsequent scanner pulse. During the rising portion of this pulse the tube 61, which is normally biased to cutoff, will be conductive since the positive voltage applied to its grid through condenser 60 is of greater magnitude than the negative bias voltage applied over connection 62. During the declining portion of the scanner pulse the negative biasing voltage will remain essentially constant while the positive voltage will drop until, at a point determined by the ratio of condensers 54 and 55, the tube 61 will cease to conduct. With the output of this tube fed over connection 63 to a differentiation circuit 64, this condition will give rise to a trigger pulse which by way of connection 51 is applied to the indicator 31. During the remainder of the cycle the switch 52, comprising for instance a suitably adjusted multivibrator having a single condition of stability, will unblock the connection 59 whereupon the condensers 54, 55 will be rapidly discharged.

The arrangement just described may be considered a modification of the system disclosed in co-pending U. S. application No. 653,264, filed March 9, 1946, Patent No. 2,495,710, granted January 31, 1950, in the name of Lester Dubin.

Figure 7:
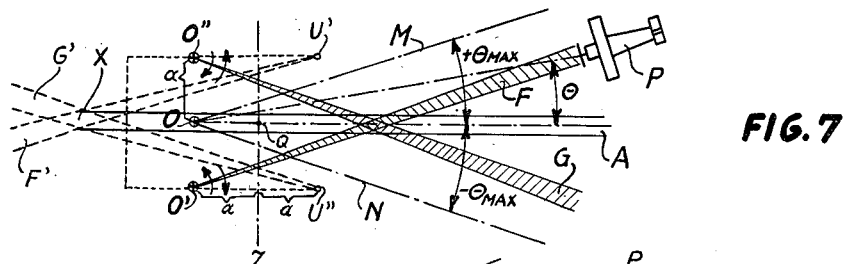
Fig. 7 is a modification of the radio beacon shown in Fig. 1.

In Fig. 7 there is shown a different form of localizer according to the present invention. Instead of being located directly behind the runway as in Fig. 1, the directive antenna array is in this case placed on a line running transverse of the runway A as shown at O', O''. A pair of sharply directive beams F, G are emitted from O', O'' respectively, which for distances substantially greater than the spacing between these two points will have the effect of fixing the point of origin of the beams at a point O which is on the air strip rather than behind it as in Fig. 1. The transmitters at each point O' and O'' may be of the type represented in part by elements 1, 3, 10, 14 and 18 shown in Fig. 3. The beams are synchronized, by any convenient mechanical or electrical arrangement, to swing symmetrically back and forth so that their point of intersection will always coincide with the runway A or its extension. It will be seen, however, that with an angle $\theta_{max}$ the same as before each beam must swing through an angle somewhat greater than 90° in order to sweep the entire area between the limits M and N.

Let us assume that an airplane P again approaches the runway A at an angle $\theta$. With the beams F and G extinguished during their clockwise and counter-clockwise swings, respectively, the airplane P will first be struck by the beam G swinging counter-clockwise and, after an interval corresponding (for distances which are large relative to O'—O'') to double the time necessary for traversing the angle $\theta$, by the beam F swinging clockwise. It will thus be seen that the beam G delivers the marker pulse and beam F the scanner pulse, the spacing between these two pulses being again proportional to $\theta$. Had the aircraft P been located in the sector between the lines A and N, in which $\theta$ is negative, the beam F would have delivered the marker and the beam G the scanner pulse. The receiver will, accordingly, be arranged so that the polarity of the control pulses applied to the localizer indicator will be determined by which of the two beams F, G are received first.

It should be noted that, since with the arrangement of Fig. 7 the marker and the scanner pulse will have substantially the same duration and intensity for all positions of the craft within the limits of $\pm\theta_{max}$, the problem of automatic volume control at the receiver may be somewhat simplified.

The localizer arrangement of Fig. 7 is likewise suited for operation in combination with known glide path systems; it may also be used in conjunction with the glide path system disclosed in co-pending application Ser. No. 789,108 filed December 1, 1947, now Patent No. 2,527,570, granted October 31, 1950, which employs an antenna array spaced laterally from the runway as is the case with the antennae positioned at O', O'' in Fig. 7.

It may be determined mathematically that the localizer system just described will be most effective for distances greater than a distance $a$ which corresponds to the spacing of antennae O', O'' from the runway. In certain cases, however, it will be desirable to extend the operation of the localizer beyond (i. e. to the left in Fig. 7) a line Z which delimits the zone of greatest effectiveness, going through a point Q spaced a distance $a$ from O, and even to maintain the system effective for points further left than O, as for the purpose of guiding airplanes taxiing on the runway. Thus it may be advantageous to provide a pair of additional directive antennae U', U'', disposed mirror-symmetrically to antennae O'', O', respectively, with reference to the line Z, antenna U' emitting a sharply directive beam F'' which may have the same characteristics as beam F and antenna U'' emitting a sharply directive beam G' which may have the same characteristics as beam G. Beams F', G' intersect on the runway A and travel at the same speed as beams F and G.

At the beginning of a cycle beams F'' and G' are triggered on simultaneously, beams F and G being extinguished at the time. The point of intersection of beams F'' and G' at the instant of their appearance may be at X, to the left of point Q. As the point of intersection reaches Q, the two beams F'', G' are extinguished and beams F, G are triggered on, effectively continuing the sweep of the former within the zone to the right of line Z.

Figure 8:
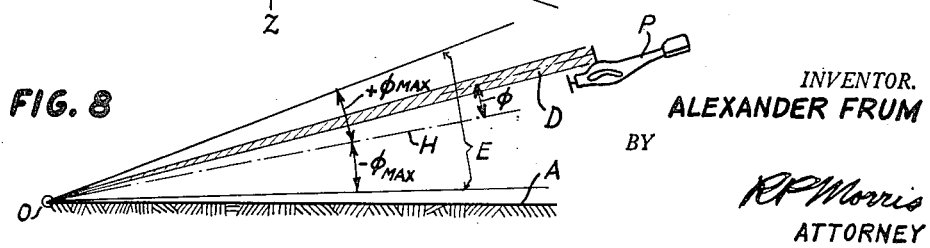
Fig. 8 is a diagrammatic elevational view of a radio beacon used for glide path indications.

Fig. 8 illustrates the application of the present invention to glide path systems. A sharply directive beam D and a broadly directive beam E originate at a point O, located behind the runway A, to produce indications for determining the deviation of an aircraft P from a glide path H. The craft P approaches the runway A at an elevational angle $\phi$ relative to the glide path H. The vertical limits of the stationary beam E define the extreme positions of the swinging beam D at an angle $\pm\phi_{max}$ relative to the glide path. In analogy with the localizer system of Fig. 1, the beam E is triggered only at the instant when the beam D goes through H, the beam D being extinguished during those quarter periods in which it passes from one of its extreme positions toward the path H. It will, of course, be desirable to establish the range of oscillation of the beam D, particularly the lower limit thereof, in such a manner that no spurious indications due to ground effects, reflections from stationary objects and the like be produced.

Figure 9:
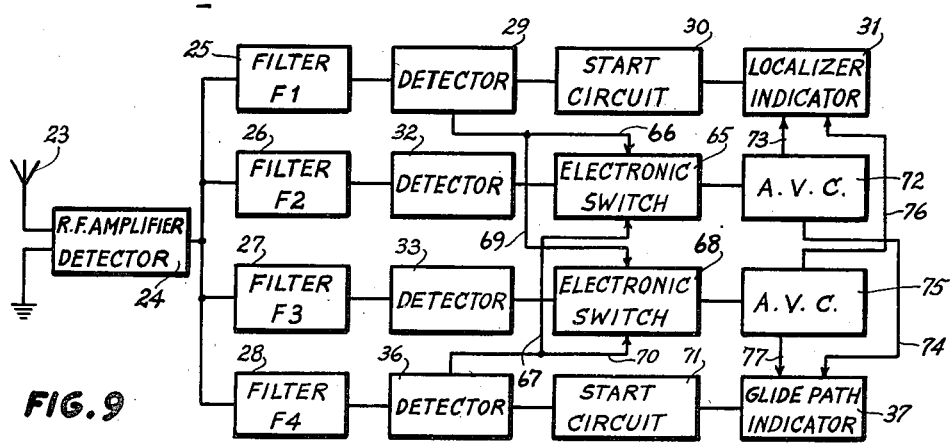
Fig. 9 is a modification of the receiver shown in Fig. 4.

The interleaving of the signals D, E of Fig. 8 with the signals B, C of Fig. 1 has been discussed above in connection with Fig. 2. A receiver circuit designed to respond to a radio beacon combining the features of Figs. 1 and 8 is illustrated in Fig. 9. In this figure, as in Fig. 4, the signals are received over antenna 23 and are applied by means of an R. F. amplifier and detector 24 and respective filters 25—28 to four detectors 29, 32, 33 and 36. Detector 29, as before, receives signals of frequency F1 which is characteristic of the localizer marker C. Detector 36 receives signals of frequency F4 which, in the present case, is characteristic of glide path marker E. Detectors 32 and 33 are respectively connected to sources of frequencies F2 and F3 both of which are common to the scanning beam B of the localizer system and to the scanning beam D of the glide path system. Frequency F2 represents the modulation periods B', D' (Fig. 2) of the scanning beams B, D when swinging through the positive sectors of $\theta$ and $\phi$, respectively; similarly, frequency F3 represents the modulation periods B'', D'' corresponding to the negative swing of these beams.

The use of the same modulating frequencies for the scanning beams D and B is made possible by the fact that the two marking beams C and E have different characteristics and are used to render the respective indicator responsive to the subsequent scanning pulse for a limited period only which should not exceed one-fourth of a cycle. Means are further provided for discharging and A. V. C. condenser shortly before or at the end of such quarter-cycle and thereupon, in response to a marker pulse, placing the condenser in condition to be recharged according to the signal strength of the following scanner pulse. These means include a first electronic switch 65, controlled from detectors 29 and 36 over connections 66 and 67, and a second electronic switch 68, controlled from these same detectors over connections 69 and 70. Detector 29, as before, feeds a start circuit 30 for a localizer indicator 31, while detector 36 feeds a start circuit 71 for a glide path indicator 37. Switch 65 connects the output of detector 32 to an automatic volume control circuit 72 which feeds signals to the indicators 31, 37 by way of connections 73, 74, respectively. Switch 68 connects the output of detector 33 to an automatic volume control circuit 75 which feeds signals to these same indicators over respective connections 76, 77.

The A. V. C. circuits 72, 75 may include beam sharpening means such as shown in Fig. 6 in which a condenser is discharged between cycles; in any event the two switches 65 and 68 respond to the marker pulses alternately from detectors 29 and 36 for causing the associated A. V. C. condenser or condensers to be charged by a scanner pulse if any such pulse is received during the following quarter cycle, and effecting the discharge of said condenser or condensers shortly before or upon the arrival of the next marker pulse.

It will be appreciated that the A. V. C. condensers could also be charged by the marker pulses themselves, according to their own signal strength, but the arrangement described is considered preferable in view of the fact that the broad marker beam may introduce a certain siting error due to the possible irregularity of this beam resulting from reflections from objects adjacent the path of the beam.

Various combinations of the features of the present invention with one another and with known localizer or glide path systems are possible as will be clear from the foregoing. The beam shapers used need not be of the form illustrated in Figs. 5 and 6 but may be based on different principles, for instance that of employing overlapping beams having the same sweep rate but being somewhat displaced in phase.

It will also be clear that the various pulses may be distinguished from one another in any convenient manner besides modulation with a single characteristic frequency as illustrated in the drawing. Thus the U. H. F. energy of the beams may be modulated with pulses of varying width or spacing, or with distinctive code impulses such as the well known A-N modulation. Either amplitude, frequency or phase modulation may be employed.

Thus, while certain preferred embodiments of the invention have been described and illustrated, it should be distinctly understood that various adaptations and modifications are possible without exceeding the spirit and scope of the invention as defined in the objects and in the appended claims.

What is claimed is:

1. In a radio direction finding system, in combination, means for producing a first directive beam radiation, means causing said beam to oscillate between predetermined limits whereby a first pulse will be transmitted to a craft positioned within said limits, means for producing a second radiation adapted to be transmitted to said craft, and means causing said second radiation covering the area within said limits to be transmitted intermittently to the craft to provide a second pulse, the spacing between said pulses being characteristic of the angular deviation of the craft from a predetermined line of reference.

2. In a radio direction finding system, the combination according to claim 1 further comprising means for simultaneously suppressing said two radiations during part of each cycle of oscillations of said first beam.

3. In a radio direction finding system, the combination according to claim 2 further comprising means for transmitting additional signal information to the craft during the suppression of said two radiations, said additional information relating to the angular deviation of the craft from a reference line which lies in a plane transverse to the plane of oscillation of said beam.

4. In a radio direction finding system, in combination, means for producing a sharply directive beam, means causing said beam to oscillate between predetermined limits whereby a first pulse will be transmitted to a craft positioned within said limits, means for producing a second directive beam effectively occupying the area between said limits, means for suppressing said second directive beam except for a brief period when said sharply directive beam passes through a predetermined line of reference whereby a second pulse will be transmitted to said craft, and means on said craft for deriving from said two pulses an indication relating to the angular position of said craft relative to said line of reference.

5. In a radio direction finding system, the combination according to claim 4 further comprising means for suppressing said sharply directive beam during one of its two successive sweeps over each of the sectors defined by said line of reference and a respective one of the said limits.

6. In a radio direction finding system, the combination according to claim 5 further comprising means for giving additional signal information to the craft during the suppression of said sharply distinctive beam, said additional information relating to the angular deviation of the craft from a reference line which lies in a plane transverse to the plane of oscillation of said beam.

7. In a radio direction finding system, in combination, means for producing two sharply directive beams originating at spaced points, means causing said beams to oscillate synchronously in opposite directions whereby the point of intersection of said beams will be displaced along a reference line and whereby pairs of spaced pulses will be transmitted to a craft positioned between said line and the limits of oscillation for said beams, and means on said craft for deriving from each of said pairs of pulses an indication relating to the angular position of said craft relative to said line of reference, the spacing between said points of origin being small relative to the mean distance at which energy from said beam is to be received.

8. In a radio direction finding system, the combination according to claim 7 further comprising means for suppressing said beams during the periods of relative displacement thereof in a predetermined sense.

9. In a radio direction finding system, the combination according to claim 8 further comprising means for giving additional signal information to the craft during the suppression of said two beams, said additional information relating to the angular deviation of the craft from a reference line which lies in a plane transverse to the plane of oscillation of the two beams.

10. A radio direction finding system for aircraft comprising a runway, an antenna array positioned at one end of said runway including a first directive antenna capable of emitting a relatively broad beam in the general direction of said runway and a second directive antenna capable of emitting a relatively narrow beam in the general direction of said runway, means for varying the directivity of said second antenna in an oscillatory fashion so as to displace the beam between fixed limits at either side of said runway, means for exciting said first antenna only at the instants when said narrow beam is aligned with said runway, there being thus produced on an aircraft positioned within the said limits a marker pulse from said broad beam, occurring at fixed intervals, and a scanner pulse from said narrow beam, having a time position relative to said marker pulse which is variable with the azimuth angle of the aircraft with respect to the runway, and means for deriving from the spacing of said pulses indication relating to the magnitude of said azimuth angle.

11. A system according to claim 10, further comprising means for applying distinctive characteristics to said narrow beam to indicate whether the same is being displaced between said runway and one or the other of the said limits, and means for deriving from said characteristics indication relating to the sign of said azimuth angle.

12. A system according to claim 10, further comprising means for suppressing said narrow beam at the instant when the directivity of said second antenna is varied in a return movement from either of said limits toward alignment with the runway whereby the production of spurious scanner pulses will be avoided.

13. A system according to claim 12, further comprising means for giving additional signal information to the aircraft during the suppression of said narrow beam, said additional information relating to the vertical deviation of the aircraft from a predetermined glide path.

14. A radio direction finding system for aircraft comprising a runway, an antenna array including two directive antennae capable of emitting a pair of sharp beams in the general direction of said runway, said antennae being equidistant from the runway and positioned on a line extending transversely thereto, means for simultaneously varying the directivity of said two antennae in oscillatory fashion so as to cause the two beams to swing symmetrically with respect to said runway between predetermined limits, there being thus produced on an aircraft positioned within the said limits pairs of spaced pulses the spacing of which is variable with the azimuth angle of the aircraft with respect to the runway, and means for deriving from said spacing an indication relating to the magnitude of said azimuth angle.

15. A system according to claim 14, further comprising means for applying distinctive characteristics to said two beams whereby the sign of said azimuth angle may be determined according to which of said beams strikes the craft first.

16. A system according to claim 14, further comprising means for suppressing said two beams during the periods of relative displacement thereof in a predetermined sense.

17. A system according to claim 16, further comprising means for giving additional signal information to the aircraft during the suppression of said two beams, said additional information relating to the vertical deviation of the aircraft from a predetermined glide path.

18. A radio direction finding system comprising a runway, means for producing a first relatively broad beam covering a sector-shaped horizontal area bisected by said runway, means for producing a first relatively narrow beam, means for horizontally oscillating said narrow beam between the limits of said broad beam, means for suppressing said broad beam except for a brief period at the instance when said narrow beam is aligned with said runway, means for extinguishing said narrow beam during its return swing from alignment with each of said limits toward alignment with said runway, said two beams producing, respectively, a localizer marker pulse and a localizer scanner pulse on an aircraft positioned between the said limits, means for producing a second relatively broad beam covering a sector-shaped vertical area bisected by an imaginary line representing a glide path, means for producing a second relatively narrow beam, means for vertically oscillating said second narrow beam between the limits of said second broad beam, the two oscillating beams having the same sweep rate and being oscillated in quadrature so that the outward swing of the first beam from its center line coincides with the inward swing of the second beam and vice versa, means for extinguishing said second narrow beam during each return swing toward said imaginary line, said second broad beam and said second narrow beam producing, respectively, a glide path marker pulse and a glide path scanner pulse on an aircraft positioned between the last-mentioned limits, and a receiver having means for deriving from said marker and spacer pulses indication relating to the deviation, if any, of an aircraft from said runway and from said glide path.

19. A system according to claim 18 wherein said receiver is located aboard the aircraft.

20. A system according to claim 18 wherein said receiver comprises a localizer indicator, a glide path indicator, an automatic volume control circuit common to both of said indicators, and means for making said two indicators alternately responsive to said control circuit in response to a respective marker pulse.

21. A radio direction finding system comprising means for producing a first directive beam, means causing said beam to oscillate between predetermined limits whereby a first pulse will be received by a craft positioned within said limits, means for producing a second directive beam adapted to be received by said craft, means causing said second beam to be received intermittently by the craft to provide a second pulse, the spacing between said pulses being characteristic of the angular deviation of the craft from a predetermined line of reference, means for deriving from said spacing an indication relating to said angular deviation, and means for sharpening the effective portion of at least said first pulse.

22. A system according to claim 21 wherein said sharpening means comprise a condenser, means for applying to said condenser a charge substantially proportional to the duration of each pulse, means for registering the peak value of said charge averaged over a succession of pulses, means for triggering said indication deriving means whenever the charge on said condenser reaches a value substantially equal to one-half of said peak value, and means for discharging said condenser before arrival of the next pulse.

23. A system according to claim 21 wherein said sharpening means comprise a condenser, means for charging said condenser to the substantial peak amplitude of each pulse, means for triggering said indication deriving means whenever the instantaneous amplitude of said pulse drops to a predetermined fraction of the charge on said condenser, and means for discharging the condenser before arrival of the next pulse.

24. A system according to claim 14, further comprising a second antenna array parallel to said first array and displaced therefrom by a distance substantially equal to the spacing between the antennae of the first array, the four antennae of the two arrays substantially defining the four corners of a square, means for simultaneously varying the directivity of the antennae of the second array so as to oscillate the same at the same rate as the antennae of the first array, the beams emitted by the second array swinging symmetrically with respect to the runway, and means for rendering each array effective in a respective zone only which starts midway between the two arrays and extends toward infinity in a direction away from the respective array.

25. A system according to claim 24, wherein said last means comprises means for triggering on the beams from one array during displacement of the point of intersection thereof toward the center of said square from a remote point, means for triggering off said beams at the moment the said center is reached, and means for triggering on the beams from the other array at the same instant and in such a position that they will effectively continue the sweep of the beams from said one array.

26. A system according to claim 25, further comprising means for applying distinctive characteristics to the beam from one antenna of the first array, means for applying similar characteristics to the beam from the diagonally opposite antenna of the opposite array, means for applying different distinctive characteristics to the beam from the other antenna of the first array, and means for applying characteristics similar to said last characteristics to the beam from the other antenna of the second array.

ALEXANDER FRUM.

REFERENCES CITED

The following references are of record in the file of this patent:

UNITED STATES PATENTS

| Number | Name | Date |
| --- | --- | --- |
| 1,135,604 | Meissner | Apr. 13, 1915 |
| 1,437,400 | Conners | Dec. 5, 1922 |
| 1,968,085 | Loth | July 31, 1934 |
| 2,112,283 | Fritz | Mar. 29, 1938 |
| 2,297,395 | Erben | Sept. 29, 1942 |
| 2,402,410 | Kear | June 18, 1946 |
| 2,404,501 | Kear | July 23, 1946 |
| 2,419,525 | Alford | Apr. 29, 1947 |